Sept. 5, 1950 — M. V. McNUTT — 2,521,593
AUXILIARY BRAKE MEANS FOR VEHICLES
Filed Oct. 1, 1948 — 2 Sheets-Sheet 1
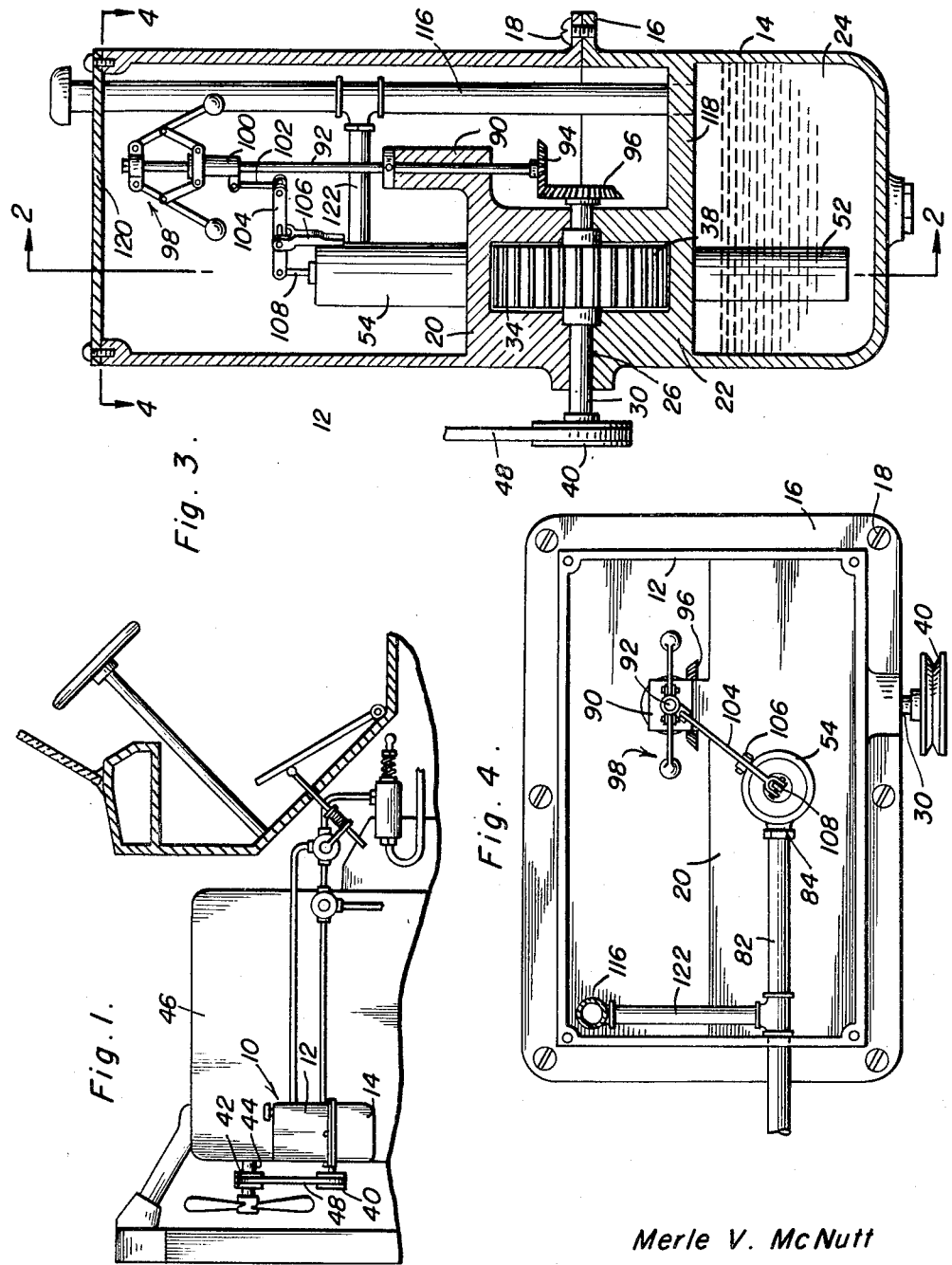
Merle V. McNutt
INVENTOR.

Sept. 5, 1950            M. V. McNUTT           2,521,593
AUXILIARY BRAKE MEANS FOR VEHICLES
Filed Oct. 1, 1948                                 2 Sheets-Sheet 2
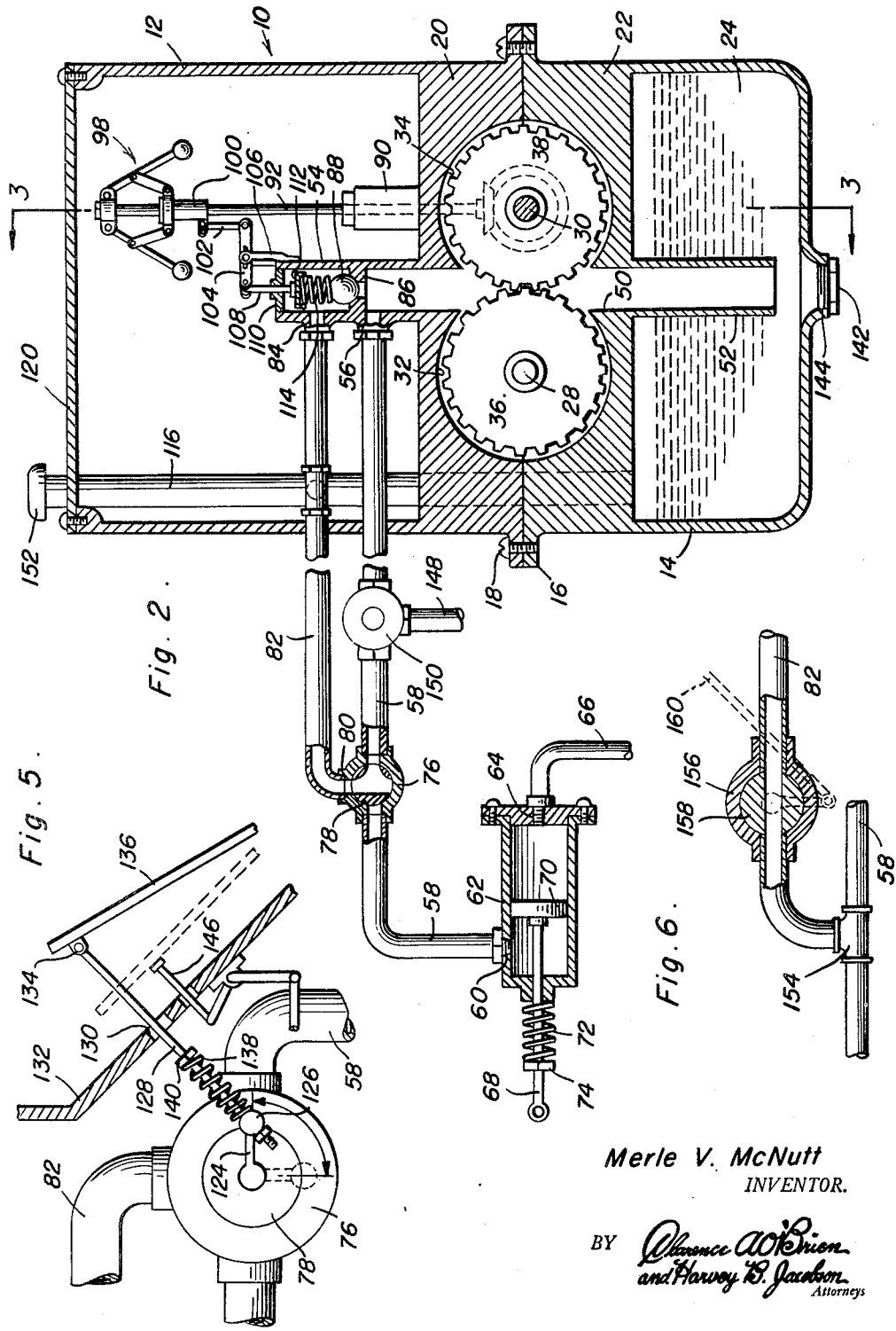
Merle V. McNutt
INVENTOR.
BY Clarence A. O'Brien
and Harvey B. Jackson
Attorneys Patented Sept. 5, 1950

2,521,593

UNITED STATES PATENT OFFICE 2,521,593

AUXILIARY BRAKE MEANS FOR VEHICLES

Merle V. McNutt, Grove City, Pa.

Application October 1, 1948, Serial No. 52,203

7 Claims. (Cl. 192—3)

This invention relates to hydraulically operated brakes for vehicles and the primary object of the present invention is to provide an auxiliary brake for vehicles including a control valve operatively connected to the accelerator pedal of a vehicle so that as pressure is applied to the pedal the valve will be in closed position, and as pressure is released from the pedal the valve will be in open position to actuate the vehicle brakes.

Another important object of the present invention is to provide an auxiliary brake for vehicles including a conduit leading to the brake line of a vehicle, and embodying novel and improved pump means driven by the fan shaft of a vehicle for forcing fluid into the conduit.

A further object of the present invention is to provide an auxiliary, hydraulically operated brake for vehicles so designed as to permit the same to be employed as a hill holder when a vehicle is stopped and which is automatically operated as an operator releases his foot from the accelerator pedal, thereby permitting the operator to use not only the normal brake on the vehicle but also the auxiliary brake in order to effectively and efficiently stop a vehicle.

A still further aim of the present invention is to provide an auxiliary brake attachment for vehicles that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a vehicle and showing the present invention applied thereto;

Figure 2 is a fragmentary longitudinal vertical sectional view taken substantially on the plane of section line 2—2 of Figure 3, and with parts thereof broken away;

Figure 3 is a transverse vertical sectional view taken substantially on the plane of section line 3—3 of Figure 2;

Figure 4 is a horizontal sectional view taken substantially on the plane of a section line 4—4 of Figure 3;

Figure 5 is an enlarged fragmentary side elevational view of the present invention and illustrating the manner in which the control valve is operated; and, Figure 6 is a view similar to Figure 5 and illustrating the control valve in slightly modified form.

Referring now to the drawings in detail, wherein for the purpose of illustration, there is disclosed a preferred embodiment of the present invention, the numeral 10 represents a pump housing generally including upper and lower halves 12 and 14 having opposed flanged portions 16 that are removably secured to each other by suitable fasteners 18.

Juxtapositioned blocks 20 and 22 are integrally formed with the adjacent ends of the halves 12 and 14 and a fluid compartment or reservoir 24 is provided in the lower half 14.

The opposed faces of the blocks 20 and 22 are provided with spaced pairs of complementary recesses 26 that receive rotatable shafts 28 and 30, and the blocks 20 and 22 are appropriately notched as at 32 and 34 to receive inter-meshed gears 36 and 38 mounted on the respective shafts 28 and 30.

One end of the shaft 30 projects outwardly from the lower half 14 and supports a pulley 40 that is connected to a further pulley 42 mounted on the fan shaft 44 of a vehicle engine 46, by an endless drive belt 48.

A substantially vertical passage 50 is provided in the blocks 20 and 22 at the engaged portions of the gears 36 and 38, communicates at its lower portion with an inlet tube 52 projecting from the block 22 into the reservoir 24, and communicates at its upper portion with a tubular post 54 projecting upwardly from the block 20.

A nipple 56 projects laterally from the post 54 and engages one end of a supply conduit 58 that leads to an aperture 60 adjacent one end of a pump cylinder 62.

A further aperture 64 is provided in one end of the cylinder 62 and receives a brake line or conduit 66 (or a conduit that is connected to the brake line of the vehicle on which the present invention is applied).

A piston rod 68 is slidably carried by the cylinder 62 and supports a piston 70 that is mounted for longitudinal movement in the cylinder 62. It should be noted, that when the piston 70 is urged toward the aperture 64 fluid in the cylinder 62 will be forced through the conduit 66 to actuate the vehicle brakes (not shown). A coil spring 72 embraces the piston rod 68 and is resiliently biased between the cylinder 62 and a nut 74 carried by the piston rod 68 to normally urge the piston 70 toward the aperture 60 as shown in Figure 2.

A valve housing 76 is disposed in the conduit 58 and supports a three-way, manually operated valve 78. The free port 80 of the housing 76 is connected to one end of a by-pass conduit or return pipe 82 that extends to a further nipple 84 carried by the post 54 above the nipple 56.

A plate 86 is integrally formed with the post 54, between the nipples 56 and 84, and is provided with a central opening that is adapted to be closed by a ball valve 88.

Journaled for rotation in a substantially vertical sleeve 90 integrally formed with the block 20, is a vertical shaft 92 the lower end of which supports a beveled gear 94 that engages a further beveled gear 96 carried by the shaft 30.

A governor mechanism 98 is mounted on the shaft 92 for rotation therewith and includes a collar 100 that is slidably mounted on the shaft 92. A link or pitman 102 depends from the collar 100 and is pivoted to one end of a pivotal lever 104 that is supported by a fulcrum 106 fixed to the post 54.

The free end of the lever 104 is pivoted to a piston 108 slidably supported by a cap 110 mounted on the post 54 and the piston 108 holds a cup 112. A coil spring 114 is positioned between the cup 112 and the ball valve 88 to resiliently urge the ball valve 88 to a closed position.

A vent pipe 116 is supported in a suitable aperture in a wall 118 projecting from the block 22, extends upwardly through the upper, removable wall 120 for the upper half 12, and communicates with the return pipe 82 through the medium of a branch pipe 122.

The valve 78 is provided with an operating lever 124 supporting a sleeve 126 to which there is secured one end of a push rod or operating arm 128. The free end of the rod 128 extends through an opening 130 provided in the floor board 132 and is pivoted as at 134 to the accelerator pedal 136.

A coil spring 138 embraces the rod 128 and is biased between the sleeve 126 and a nut 140 receivably engaged on the rod 128 to normally urge the rod 128 toward the pedal 136 and hence the pedal 136 to a raised position and also the valve 78 to a position whereby fluid will flow from the conduit 58 into the pump cylinder 62.

In order to remove or drain the fluid from the reservoir 24, there is provided a removable drain plug 142 that receivably engages an internally threaded opening 144 in the lower wall of the half 14.

In practical use of the present invention, the shaft 30 is rotated by the fan shaft 44 and the gears 36 and 38 are driven to cause a suction in the passage 50 whereby fluid in the reservoir 24 will be pumped through the passage 50 and into the conduit 58.

When the foot pedal 136 is lowered to engage the accelerator linkage 146, the valve 78 is in the position shown in Figure 2 and the fluid will not enter the cylinder 62. However, when the foot pedal 136 is raised to its normal and unused position, as shown by full lines in Figure 2, the valve 78 will be moved to an open position and fluid pumped through the conduit 58 will enter the cylinder 62 to force the brake fluid, normally against the piston 70, through the conduit 66 to brake the vehicle wheels.

In case the vehicle engine is not running or the system fails, the rod 68 is connected by suitable linkage (not shown) to the usual brake pedal and as the latter is depressed the piston 70 will be forced toward the aperture 64 with the same effect as previously described.

When the engine 46 is running at a relatively low rate of speed, the governor mechanism will not restrict the ball valve 88 and permits the same to rise when the pressure becomes strong enough to brake the car at a reasonable distance. However, when the engine 46 is running at a relatively high speed and the car is moved relatively fast, the governor mechanism exerts pressure on the valve 88 and the same will not rise until the pressure is increased sufficiently to brake the car at a reasonable distance.

Branching from the conduit 58, is an auxiliary pipe line or conduit 148 that is controlled by a manually operated valve 150. This latest conduit 148 is connected to suitably hydraulically operated jacks (not shown) mounted on the vehicle axle whereby the vehicle may be lifted when desired for removing tires or the like.

The filler tube 116 is provided with a filler supporting cap 152 and a suitable measuring stick (not shown) in order to determine the quantity of oil or fluid in the reservoir 24.

Figure 6 represents the control valve used in conjunction with the present invention in slightly modified form. In this embodiment, the valve housing 76 is removed and is replaced by a T-joint 154 and a one-way valve housing 156 is disposed in the by-pass conduit 82.

A one-way valve 158 mounted in the housing 156 and is connected by links 160 to the accelerator pedal 136 in the manner previously described so that as the pedal 136 is advanced, the valve 158 will be open allowing oil to flow from the main pump or housing 10 to conduit 58, through conduit 82 and back to the reservoir.

When the pedal 136 is released, the valve 158 will close, stopping the flow of oil back to the pump through the by-pass conduit 82, therefore the oil will be forced into the cylinder 62 to operate the vehicle brakes. When the pressure is sufficient to stop the car, the oil will be forced through the by-pass valve (88) in the pump that is controlled by the governor.

The advantage of this latest structure is that the pump will be under no pressure except when the brakes are applied.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In combination with a vehicle having a fan drive shaft, an accelerator pedal and fluid brake line; an auxiliary brake comprising, a reservoir, a conduit leading from said reservoir and having a return pipe, a first pump communicating with the brake line and said conduit, a second pump operatively connected to the drive shaft for forcing a fluid through said conduit to actuate said first pump, a valve controlling the flow of fluid through said conduit and operated by said accelerator pedal, a further valve controlling the flow of fluid through the return pipe, and means mounted in the reservoir and responsive to the speed rotation of the drive shaft for actuating said further valve.

2. The combination of claim 1 wherein said last named means includes a governor mechanism operated by and connected directly to said second pump and controlling said further valve.

3. The combination of claim 1 wherein said last named means includes a governor mechanism operated by said second pump, and linkage between said mechanism and said further valve, said linkage being actuated by said governor mechanism and controlling said further valve.

4. The combination of claim 3 wherein said linkage includes a pivotal lever, a pitman connecting one end of said lever to said governor mechanism, a plunger carried by the free end of said lever, and a resilient member urged by said plunger against said further valve.

5. In combination with the accelerator pedal and brake line of a vehicle, an auxiliary brake comprising a housing including upper and lower hollow members, said lower member constituting a reservoir, a conduit leading from the upper member to the brake line, a supply passage between the conduit and the lower member, a pump mounted in the housing for impelling fluid in the lower member to the conduit, a valve mounted in the conduit and operated by the foot pedal for controlling the flow of fluid through the conduit, a further valve mounted in the housing and controlling the flow of fluid through the passage, means for operating the pump, a rotary shaft mounted within the housing, a drive connection between the pump and the shaft, a sliding collar received on said shaft, a fly ball governor mounted on said shaft and responsive to the rotation of the shaft for imparting a sliding movement to the collar, and a linkage between the collar and the further valve actuated during sliding movement of the collar in one direction for urging the further valve to a closed position.

6. In combination with the accelerator pedal, brake line and fan drive shaft of a vehicle; an auxiliary brake comprising a housing constituting a reservoir, a conduit leading from the reservoir and having a return pipe, a first pump communicating with the conduit and the brake line, a second pump mounted in the housing for forcing a fluid through said conduit to actuate said first pump, a driving connection between said pump and said fan shaft, a first valve controlling the flow of fluid through the conduit, a connector between the first valve and the foot pedal for moving the first valve to a closed position as pressure is released from the foot pedal, said pump including a driven shaft, a rod driven directly by said driven shaft, a sliding member mounted on said rod, a second valve controlling the flow of fluid through the return pipe, a connecting linkage between said second valve and said sliding member, and means mounted on the rod and responsive to the speed rotation of the rod for imparting a sliding movement to the member to move the second valve to its closed position.

7. The combination of claim 6 wherein said driving connection includes a pulley on said driven shaft disposed exteriorly of said housing, a further pulley on said fan drive shaft, and an endless belt trained about said pulleys.

MERLE V. McNUTT.

REFERENCES CITED

The following references are of record in the file of this patent:

UNITED STATES PATENTS

| Number | Name | Date |
| --- | --- | --- |
| 1,517,361 | Harrigan | Dec. 2, 1924 |
| 1,577,105 | Cottoneo | Mar. 16, 1926 |
| 1,903,973 | Boughton | Apr. 18, 1933 |
| 2,165,817 | Safford | July 11, 1939 |
| 2,188,234 | Schwenn | Jan. 23, 1940 |
| 2,194,197 | Millican | Mar. 19, 1940 |
| 2,207,817 | Jean-Baptiste Van | July 9, 1940 |
| 2,387,716 | Chilton | Oct. 30, 1945 |